US012777080B2

(12) United States Patent
Chen

(10) Patent No.: US 12,777,080 B2
(45) Date of Patent: Oct. 27, 2026

(54) GATEWAY NETWORK SYSTEM WITH DISTRIBUTING NETWORK CONNECTION MANAGEMENT AND GATEWAY MANAGEMENT METHOD

(71) Applicant: TPIsoftware Corporation, Taipei City (TW)

(72) Inventor: Ruei-Tai Chen, Taipei City (TW)

(73) Assignee: TPIsoftware Corporation, Taipei (TW)

( * ) Notice: Subject to any disclaimer, the term of this patent is extended or adjusted under 35 U.S.C. 154(b) by 38 days.

(21) Appl. No.: 19/058,012

(22) Filed: Feb. 20, 2025

(65) Prior Publication Data

US 2026/0019449 A1 Jan. 15, 2026

(30) Foreign Application Priority Data

Jul. 11, 2024 (TW) ................................ 113126023

(51) Int. Cl.
*G06F 15/16* (2006.01)
*H04L 9/40* (2022.01)
*H04L 65/1043* (2022.01)

(52) U.S. Cl.
CPC ........ *H04L 65/1043* (2013.01); *H04L 63/083* (2013.01)

(58) Field of Classification Search
CPC .......................... H04L 65/1043; H04L 63/083
USPC .......................................................... 709/227
See application file for complete search history.

(56) References Cited

U.S. PATENT DOCUMENTS

| | | | | |
|---|---|---|---|---|
| 12,067,140 B2 * | 8/2024 | Yang | ........................ | G06F 16/93 |
| 12,238,246 B2 * | 2/2025 | Lew | ........................ | H04L 51/58 |
| 2016/0224638 A1 | 8/2016 | Bestler et al. | | |
| 2022/0343011 A1 | 10/2022 | Yang et al. | | |
| 2022/0417361 A1 | 12/2022 | Lew et al. | | |

FOREIGN PATENT DOCUMENTS

| | | |
|---|---|---|
| TW | 201918056 A | 5/2019 |

* cited by examiner

*Primary Examiner* — Alicia Baturay

(57) ABSTRACT

A gateway network system with distributed network connection management and a gateway management method. The method includes a gateway management node device receiving a user's token request to convert a java script object notation (json) and logging an available limit value and a used limit value in a memory unit. The json, the available limit value and the used limit value are synchronized to a gateway management slave server and saved to a database. When the gateway management slave server receives an operation request, the method revises the used limit value and compares the used limit value with the available limit value. If the used limit value has not exceeded the available limit value, the used limit value is increased by one. If the used limit value has exceeded the available limit value, a stop operation message is returned to the gateway management node device and provided to the user.

14 Claims, 6 Drawing Sheets

GATEWAY NETWORK SYSTEM WITH DISTRIBUTING NETWORK CONNECTION MANAGEMENT AND GATEWAY MANAGEMENT METHOD

BACKGROUND

1. Technical Field

The present application relates to a gateway network system with distributed network connection management and a gateway management method. Specifically, the present application relates to a gateway network system and gateway management method capable of effectively managing user token logins.

2. Description of the Related Art

With the increasing prevalence of internet connectivity, users can now use smartphones, tablets, or computers to connect to various server-based application programming interfaces (APIs) for activities such as retrieving information, ordering food, making payments, playing games, or browsing social media.

Conventionally, servers provide users with token login verification through application programming interfaces (APIs) to establish connections. However, in current systems, token verification is performed directly by servers. In distributed architectures composed of multiple servers, this approach introduces challenges related to token data synchronization and consistency, potentially affecting user login behavior. Additionally, when logging into a server's API using a token, the traditional approach requires engineers to write program code to update server content individually. This method significantly increases the likelihood of security and management issues due to reliance on personnel quality. A security breach could result in severe security vulnerabilities.

Accordingly, the key issue and focus of this application is the provision of a management system that resolves the issue of token data synchronization or unification in distributed server architectures, while also preventing potential information security issues.

SUMMARY

One objective of the present application is to provide a gateway network system with distributed network connection management and a gateway management method for enabling token data synchronization or unification in distributed server architectures.

Another objective of the present application is to provide a gateway network system with distributed network connection management and a gateway management method that can prevent potential information security issues.

The gateway management method with distributed network connection management of the present application is applied in a large-scale application program interface of a gateway network system, wherein the gateway network system is designed to manage a token request for login by at least one user through at least one user end processing device to connect to an enterprise end server, and wherein the gateway network system includes a plurality of gateway management node devices, a plurality of gateway management slave servers, and a database. The database stores the available limit value and the used limit value. Each gateway management node device includes a node end transmission unit, a node end processing unit, and a memory unit, wherein each gateway management slave server includes a slave server end transmission unit and a slave server end processing unit, and wherein the node end processing unit has an application program interface module and each node end transmission unit is signally connected to the user end processing device and the slave server end transmission units. Each slave server end transmission unit is signally connected to the corresponding node end transmission unit individually and the database, wherein the gateway management method includes the following steps:

a) the node end transmission unit of one of the gateway management node devices receives the token request transmitted by the user through the user end processing device, and the node end processing unit then determines whether the token request is valid, and if the token request is valid, the token request is stored in the memory unit and a connection to the enterprise end server is established;

b) the application program interface module of the node end processing unit converts the token request into a java script object notation (json) and transmits the java script object notation (json) to one of the corresponding gateway management slave servers through the node end transmission unit;

c) the slave server end transmission unit of the gateway management slave server receives the java script object notation (json) transmitted by the node end transmission unit respectively and stores the java script object notation (json) in the database; and d) when the node end transmission unit of one of the gateway management node devices receives an operation request input by the user logging into the application program interface module through the user end processing device, the node end processing unit transmits the operation request to one of the corresponding gateway management slave servers through the node end transmission unit.

In gateway management method of the present invention, the token request has an available limit value and a used limit value for recording the token request, wherein the gateway management method further includes the following steps after step d):

e) the slave server end transmission unit of the gateway management slave server receives the operation request, and the slave server end processing unit determines whether the used limit value of the token request exceeds the available limit value; if it does not, the slave server end processing unit allows the operation request and connects to the corresponding gateway management node device through the slave server end transmission unit, and modifies the corresponding used limit value stored in the corresponding the memory unit, increasing the used limit value by one; and f) if the used limit value of the token request exceeds the available limit value, the slave server end processing unit denies the user access.

In the gateway management method of the present invention, the available limit value and the used limit value have a corresponding time and location information, wherein step c) includes the following steps:

c1) the slave server end processing unit returns the modified time and location information to the corresponding gateway management node device through the slave server end transmission unit; and c2) the node end transmission unit of the gateway management node device receives the modified time and location information, and the node end processing unit stores the modified time and location information in the memory unit.

In the gateway management method of the present invention, the gateway network system further includes a gateway management master server, and the gateway management master server includes a master server end transmission unit and a master server end processing unit. The master server end transmission unit is signally connected to each slave server end transmission unit of the gateway management slave server and the database, wherein step c) further includes the following steps after step c2):

c3) the slave server end processing unit of one of the gateway management slave servers transmits its associated time and location information to the gateway management master server through the slave server end transmission unit;

c4) the master server end transmission unit of the gateway management master server receives the time and location information and enables the master server end processing unit to perform time adjustment, and the corrected time and location information then is transmitted to other gateway management slave servers through the master server end transmission unit; and c5) each slave server end transmission unit of the gateway management slave server receives the corrected time and location information for allowing each slave server end processing unit to perform time adjustment.

In the gateway management method of the present invention, step c) further includes the following steps after step c2):

c3) each node end processing unit of the gateway management node device periodically sends a time adjustment request information to the corresponding gateway management slave server through the node end transmission unit after a predetermined time interval;

c4) each slave server end transmission unit of the gateway management slave server receives the time adjustment request information so that the slave server end processing unit can determine whether time correction is necessary and update the available limit value and the used limit value; and c5) If a correction is required, the slave server end processing unit transmits the corrected time and location information along with the updated available limit value and the used limit value to the corresponding gateway management node device through the slave server end transmission unit, the node end processing unit receives the corrected time and location information along with the updated available limit value and the used limit value through the node end transmission unit, and then all such information is stored in the database to perform time and location information correction and update the data.

In the gateway management method of the present invention, the method further includes the following steps after step f):

g) when the node end transmission unit of one of the gateway management node devices receives a token revocation request input by the user using the application program interface module through the user end processing device, the node end transmission unit transmits the token revocation request to one of the corresponding gateway management slave servers through the node end transmission unit;

h) the slave server end transmission unit of the gateway management slave server receives the token revocation request, and the slave server end processing unit connects to the database through the slave server end transmission unit and then modifies the corresponding available limit value, resetting the available limit value to zero and updating the time and location information; and i) the slave server end processing unit connects to the corresponding gateway management node device through the slave server end transmission unit and modifies the corresponding available limit value stored in the corresponding memory unit, resetting the available limit value to zero and updating the time and location information.

In the gateway management method of the present invention, the gateway network system further includes a load balancer which is connected by telecommunication to the user end processing device and the gateway management node device, wherein the gateway management method further includes the following additional step in step j') before step a): the load balancer provides the connection to the gateway management node device for load distribution to one of the gateway management node devices.

The gateway management system with distributed network connection management of the present application, applied for gateway control of a large-scale application program interface, facilitates managing a token request from at least one user through at least one user end processing device during login for connecting to an enterprise end server, wherein the gateway network system includes a database, a plurality of gateway management node devices, and a plurality of gateway management slave servers, wherein the available limit value and the used limit value are stored in the database.

The gateway management node device includes a node end transmission unit, a node end processing unit, and a memory unit, wherein the node end transmission unit is signally connected to the user end processing device and receives the token request transmitted by the user through the user end processing device, and the node end processing unit has an application program interface module for determining whether the token request is valid. If the request is valid, a connection to the enterprise end server is allowed, and the token request is converted into a java script object notation (json), and the java script object notation (json) is output through the node end transmission unit. When the node end transmission unit receives an operation request input by the user logging into the application program interface module through the user end processing device, the node end transmission unit outputs the operation request through the node end transmission unit, and the memory unit stores the java script object notation (json).

Each gateway management slave server includes a slave server end transmission unit and a slave server end processing unit, wherein the slave server end transmission unit is signally connected to each node end transmission unit and the database and receives the java script object notation (json) and the operation request transmitted from the node end transmission unit respectively, and stores the java script object notation (json) in the database. When the slave server end transmission unit receives the operation request, and the slave server end processing unit connects to the database through the slave server end transmission unit.

In the gateway management system of the present invention, the token request has an available limit value and a used limit value for recording the token request, and the slave server end processing unit further determines whether the used limit value exceeds the available limit value. If not, the slave server end processing unit allows the operation request and connects to the corresponding gateway management node device through the slave server end transmission unit. The slave server end processing unit modifies the corresponding used limit value stored in the corresponding memory unit by increasing the used limit value by one. If yes, the slave server end processing unit denies the user access.

In the gateway management system of the present invention, the available limit value and the used limit value have a corresponding time and location information, wherein the slave server end processing unit returns the modified time and location information to the corresponding gateway management node device through the slave server end transmission unit, the node end transmission unit of the gateway management node device receives the modified time and location information, and the modified time and location information is stored in the memory unit by the node end processing unit.

In the gateway management system of the present invention, the gateway network system further includes a gateway management master server, and the gateway management master server includes a master server end transmission unit and a master server end processing unit. The master server end transmission unit is signally connected to each slave server end transmission unit of the gateway management slave server and the database, wherein the slave server end processing unit of one of the gateway management slave servers transmits the associated time and location information to the gateway management master server through the slave server end transmission unit; the master server end transmission unit of the gateway management master server receives the time and location information for allowing the master server end processing unit to perform time adjustment and then transmits the corrected time and location information to other gateway management slave servers through the master server end transmission unit. Each slave server end transmission unit of the gateway management slave server receives the corrected time and location information for allowing each slave server end processing unit to perform time adjustment.

In the gateway management system of the present invention, each node end processing unit of the gateway management node device periodically sends a time adjustment request information to the corresponding gateway management slave server through the node end transmission unit after a predetermined time interval, and each slave server end transmission unit of the gateway management slave server receives the time adjustment request information, enabling the slave server end processing unit to determine whether time correction is necessary and update the available limit value and the used limit value. If a time correction is required, the slave server end processing unit transmits the corrected time and location information along with the updated available limit value and the used limit value to the corresponding gateway management node device through the slave server end transmission unit; the corrected time and location information along with the updated available limit value and the used limit value are received and stored in the database by the node end processing unit through the node end transmission unit to perform time and location information correction and update the data.

In the gateway management system of the present invention, when the node end transmission unit of one of the gateway management node devices receives a token revocation request input by the user using the application program interface module through the user end processing device, the node end transmission unit transmits the token revocation request to one of the corresponding gateway management slave servers through the node end transmission unit; the slave server end transmission unit of the gateway management slave server receives the token revocation request, and the slave server end processing unit connects to the database through the slave server end transmission unit and modifies the corresponding available limit value by resetting the available limit value to zero and updating the time and location information. The slave server end processing unit connects to the corresponding gateway management node device through the slave server end transmission unit and modifies the corresponding available limit value stored in the corresponding memory unit by resetting the available limit value to zero and updating the time and location information.

In the gateway management system of the present invention, the gateway network system further includes a load balancer connected by telecommunication to the user end processing device and the gateway management node device, wherein the load balancer provides the connection to the gateway management node device for load distribution to one of the gateway management node devices.

The gateway network system with distributed network connection management and a gateway management method of the present application is designed to process user's token requests through a plurality of gateway management node devices. This approach ensures that the token data is effectively synchronized or unified. Additionally, the gateway management slave servers perform timely comparisons between the recorded used limit value and the available limit value for token requests. If the used limit value exceeds the available limit value, the system returns an operation stop message and appropriately updates the token request data. This mechanism helps prevent security issues and achieves the aforementioned objectives.

DETAILED DESCRIPTION OF THE EMBODIMENTS

Figure 1:
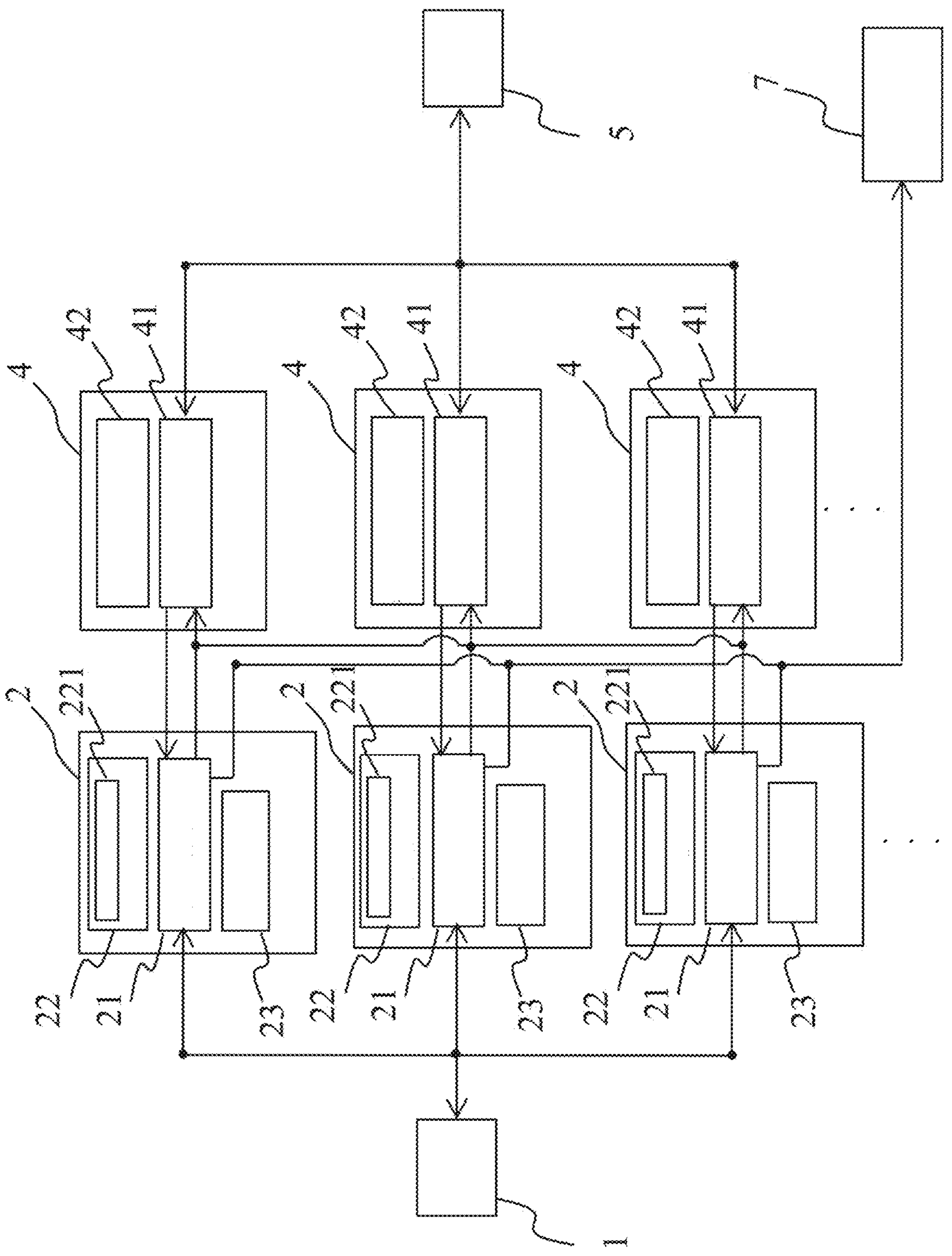
FIG. 1 is a block diagram illustrating a first preferred embodiment of a gateway network system with distributed network connection management and a gateway management method according to the present invention.

The present application relates to a gateway network system with distributed network connection management and a gateway management method applicable to a large-scale application programming interface (API). In the first embodiment, as shown in FIG. 1, the gateway network system is designed to manage a token request for login by at least one user through at least one user end processing device 1. It also provides a connection to an enterprise end server 7, defines an available limit value for token requests, and records a used limit value for token requests. The gateway network system includes a plurality of gateway management node devices (GTW in-memory) 2, a plurality of gateway management slave servers 4, and a database (MS) 5.

The database (MS) 5 is used to store the available limit value and the used limit value. Each gateway management node device 2 includes a node end transmission unit 21, a node end processing unit 22, and a memory unit (memory) 23. Each gateway management slave server 4 includes a slave server end transmission unit 41 and a slave server end processing unit 42. The node end processing unit 22 has an application program interface module (API) 221. Each node end transmission unit 21 is signally connected to the user end processing device 1 and the slave server end transmission unit 41. Each slave server end transmission unit 41 is signally connected to each node end transmission unit 21 and the database 5.

Figure 2:
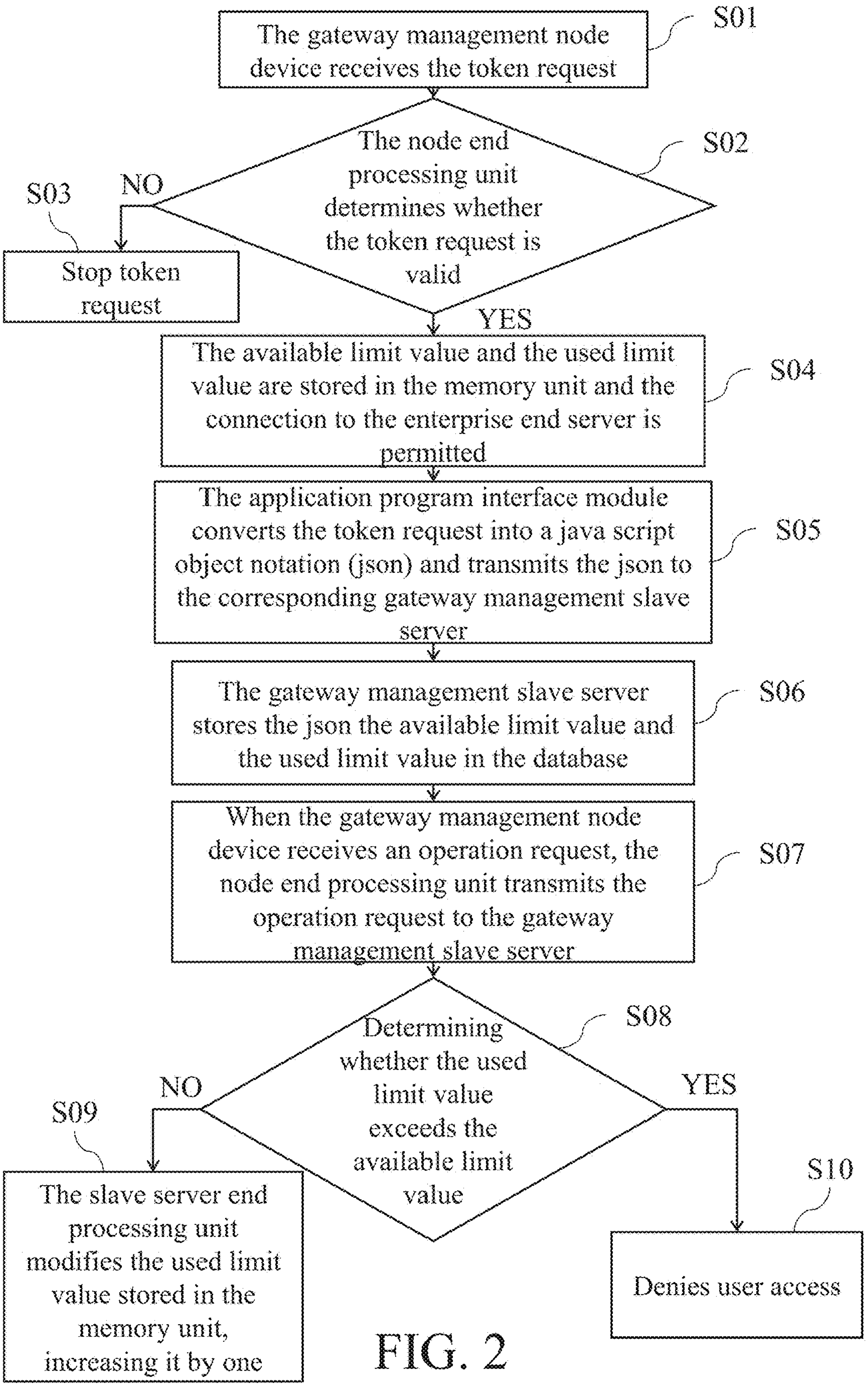
FIG. 2 is a flowchart of the gateway management method shown in FIG. 1.

As shown in FIG. 2, which illustrates the flowchart of the gateway management method in this application, the process begins at Step S01, wherein one of the node end transmission units 21 of a gateway management node device 2 receives a token request transmitted by a user through the user end processing device 1. Next, proceeding to Step S02, the node end processing unit 22 determines whether the token request is valid. If the token request is invalid, the process moves to Step S03, where the token request is stopped. If the token request is valid, the process moves to Step S04, where the associated available limit value and the used limit value are stored in the memory unit (memory) 23 and the connection to the enterprise end server 7 is permitted. Further, in Step S05, the application program interface module (API) 221 of the node end processing unit 22 converts the token request into a java script object notation (json). Then the java script object notation (json) is transmitted to one of the corresponding gateway management slave servers 4 through the node end transmission unit 21.

Proceeding to step S06, the slave server end transmission unit 41 of the gateway management slave server 4 receives the java script object notation (json) transmitted by each node end transmission unit 21. Then the java script object notation (json) along with the associated available limit value and the used limit value are stored in the database (MS) 5. Following this, in Step S07, when the node end transmission unit 21 of one of the gateway management node devices 2 receives an operation request input by a user logging into the application program interface module (API) 221 through the user end processing device 1, the node end processing unit 22 transmits the operation request to one of the corresponding gateway management slave servers 4 through the node end transmission unit 21.

Additionally, in this embodiment, the system can determine the eligibility of the token. As shown in Step S08, the slave server end processing unit 42 determines whether the used limit value exceeds the available limit value. If it is determined that the used limit value does not exceed the available limit value (e.g., the available limit value is 10 and the used limit value is 9), the process proceeds to Step S09, where the slave server end processing unit 42 permits the operation request. It then connects to the corresponding gateway management node device 2 through the slave server end transmission unit 41 and modifies the used limit value stored in the corresponding the memory unit (memory) 23 by increasing the used limit value by one.

If it is determined that the used limit value does exceed the available limit value (e.g., the available limit value is 10 and the used limit value is 11), the process proceeds to Step S10, where the slave server end processing unit 42 does not permit the operation request and denies the user access. Subsequently, the slave server end transmission unit 41 returns an access denied message to the corresponding gateway management node device 2, which in turn the gateway management node device 2 returns the access denied message to the user end processing device 1 through the node end transmission unit 21. This prompts the user to issue a new authorization request by acquiring another token. If the available limit value for the token needs to be purchased separately by the user, the system may require the user to purchase an additional available limit for the token.

Figure 3:
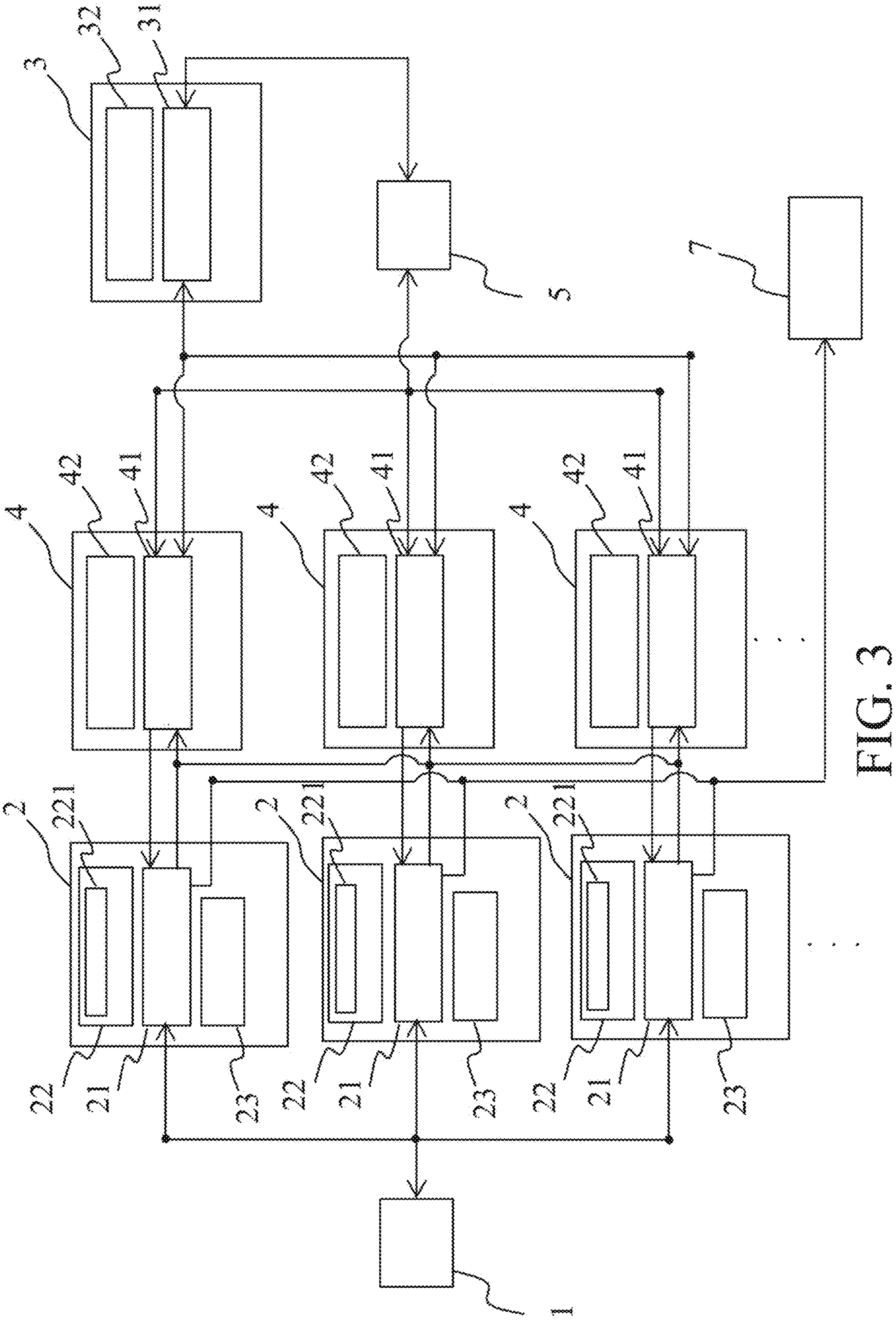
FIG. 3 is a block diagram illustrating a second preferred embodiment of the gateway network system with distributed network connection management and the gateway management method according to the present invention.

The second embodiment of the present application gateway network system with distributed network connection management and a gateway management method is shown in FIG. 3. In this embodiment, the gateway network system further includes a gateway management master server 3, and the gateway management master server 3 includes a master server end transmission unit 31 and a master server end processing unit 32. The master server end transmission unit 31 is signally connected to each slave server end transmission unit 41 of the gateway management slave server 4 and the database 5. Furthermore, in this embodiment, the available limit value and the used limit value have a corresponding time and location information (t).

Figure 4:
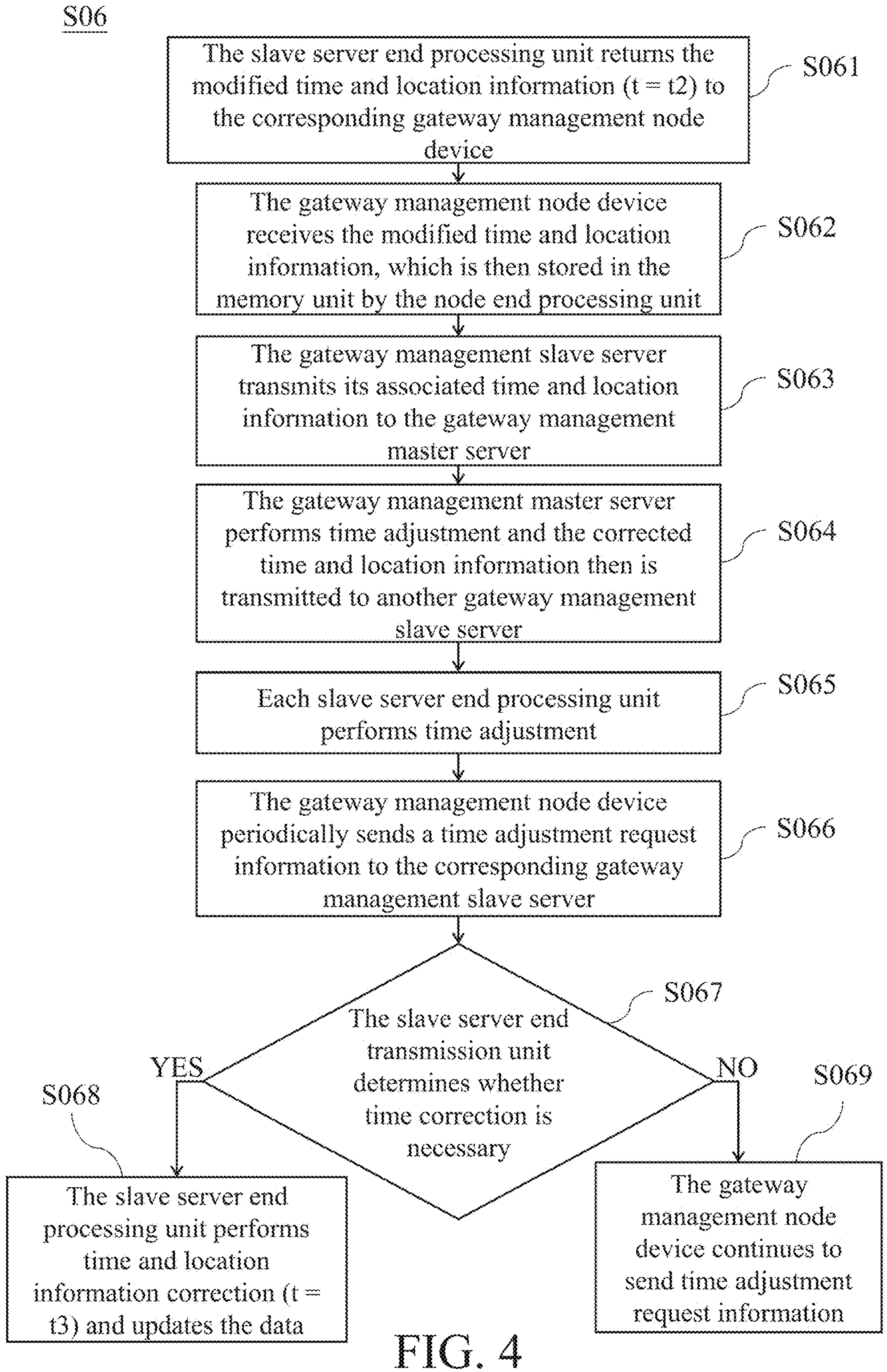
FIG. 4 is a flowchart of the gateway management method shown in FIG. 3.

Referring to FIG. 2 and FIG. 4, step S06 further includes the following time adjustment steps. Initially, in step S061, the slave server end processing unit 42 returns the modified time and location information (t=t2) to the corresponding gateway management node device 2 through the slave server end transmission unit 41. Subsequently, in step S062, the node end transmission unit 21 of the gateway management node device 2 receives the modified time and location information, which is then stored in the memory unit (memory) 23 by the node end processing unit 22.

Additionally, after step S062, the process includes the following time recording steps. Initially, in step S063, the slave server end processing unit 42 of one of the gateway management slave servers 4 transmits its associated time and location information to the gateway management master server 3 through the slave server end transmission unit 41. Subsequently, in step S064, the master server end transmission unit 31 of the gateway management master server 3 receives the time and location information for allowing the master server end processing unit 32 to perform time adjustment. The corrected time and location information is then transmitted to another gateway management slave server 4 through the master server end transmission unit 31. Lastly, in step S065, each slave server end transmission unit 41 of a plurality of gateway management slave servers 4 receives the corrected time and location information, enabling each slave server end processing unit 42 to perform time adjustment.

Next, after step S065, the process continues with a time update step. In step S066, each node end processing unit 22 of the gateway management node device 2 periodically sends a time adjustment request information to the corresponding gateway management slave server 4 through the node end transmission unit 21 after a predetermined time interval. Then, in step S067, each slave server end transmission unit 41 of the gateway management slave server 4 receives the time adjustment request information, which is provided to the slave server end processing unit 42 to determine whether time correction is necessary and update the available limit value and the used limit value. If the time correction is required, then in step S068, the slave server end processing unit 42 transmits the corrected time and location information (t=t3) along with the updated available limit value and the used limit value to the corresponding gateway management node device 2 through the slave server end transmission unit 41. The node end processing unit 22 then receives the corrected time and location information (t=t3) along with the updated available limit value and the used limit value through the node end transmission unit 21 and stores this information in the database (MS) 5 to perform time and location information correction and update the data. If the time correction is no required, then in step S069, each node end processing unit 22 of the gateway management node device 2 continues to send time adjustment request information to the corresponding gateway management slave server 4 at a predetermined time interval.

Figure 5:
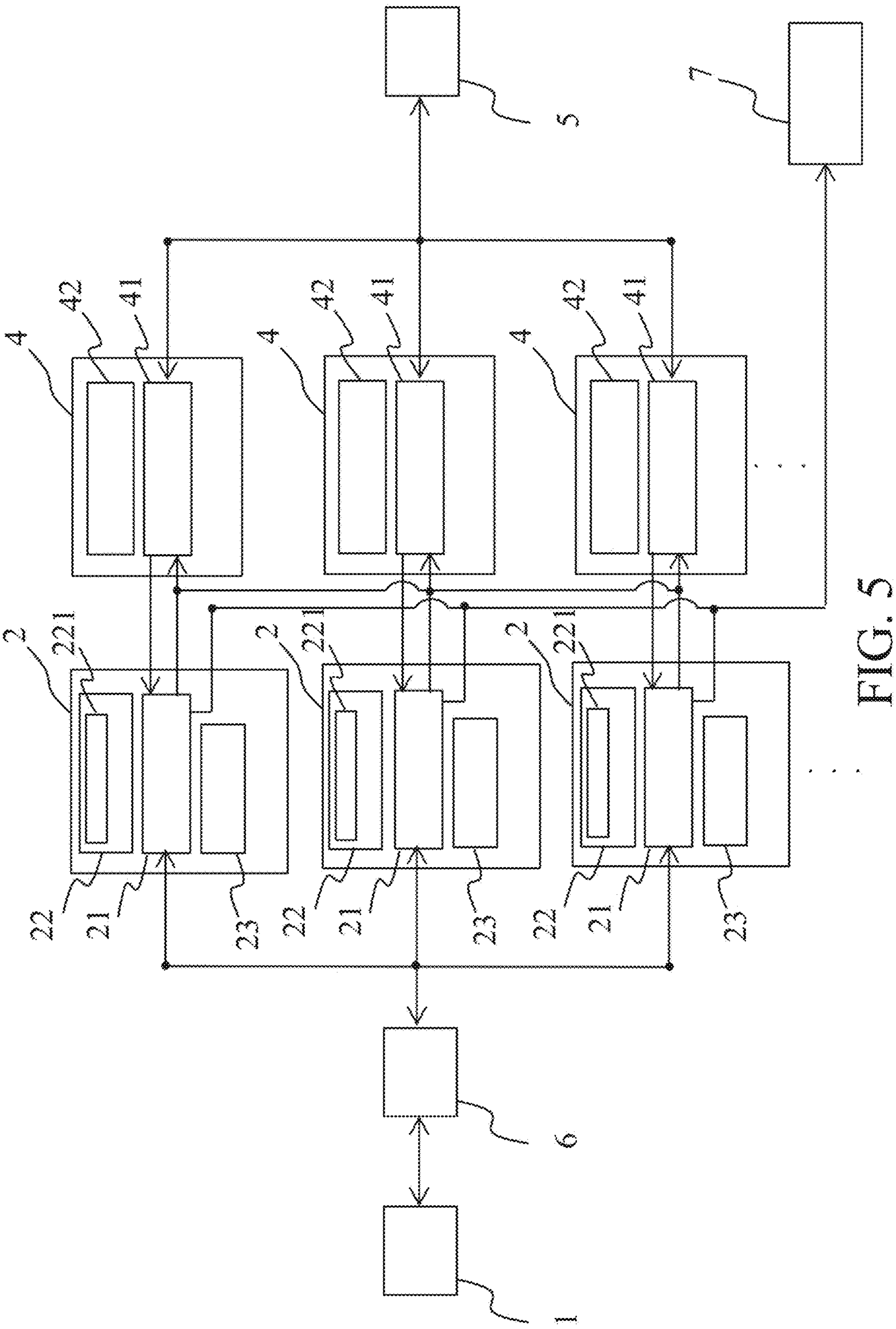
FIG. 5 is a block diagram illustrating a third preferred embodiment of the gateway network system with distributed network connection management and the gateway management method according to the present invention.
Figure 6:
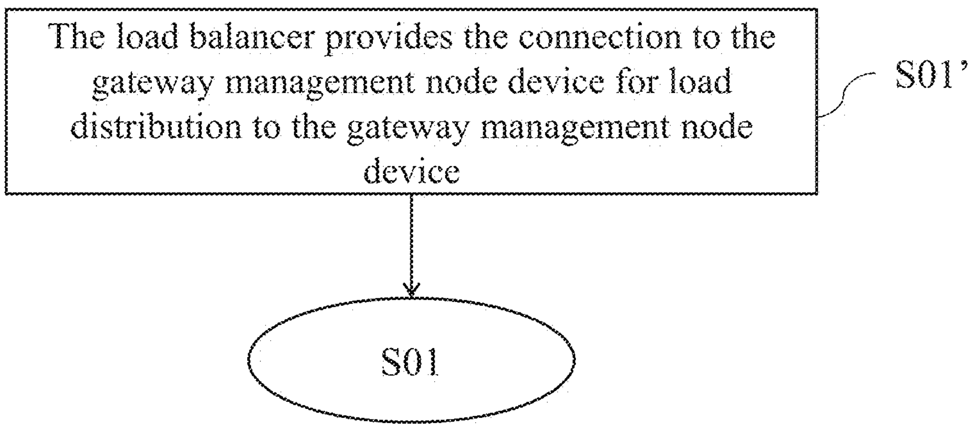
FIG. 6 and FIG. 7 are flowcharts of the gateway management method shown in FIG. 5.

The third embodiment of the present application, a gateway network system with distributed network connection management and a gateway management method, is shown in FIG. 5. In this embodiment, the gateway network system further includes a load balancer 6, which is connected by telecommunication to the user end processing device 1 and the gateway management node device 2. Referring also to FIG. 6, before step S01, an additional load distribution step is included, as shown in step S01'. In this step, the load balancer 6 provides the connection to the gateway management node device 2 for load distribution to one of the gateway management node devices 2.

Figure 7:
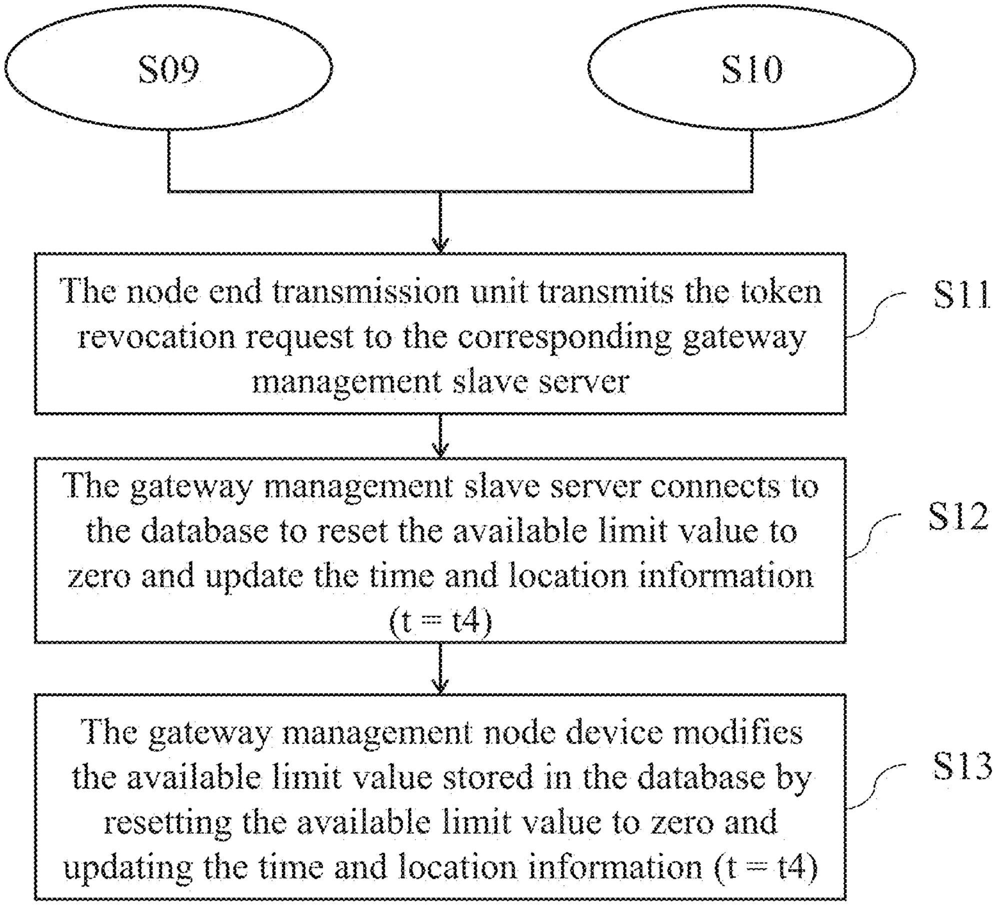

Additionally, with reference to FIG. 7, in this embodiment, after step S09 and step S100, the following token (token) revocation request steps are included. As shown in step S11, when the node end transmission unit 21 of one of the gateway management node devices 2 receives a token revocation request input by the user using the application program interface module (API) 221 through the user end processing device 1, the gateway management node device 2 transmits the token revocation request to one of the corresponding gateway management slave servers 4 through the node end transmission unit 21. In step S12, the slave server end transmission unit 41 of the gateway management slave server 4 receives the token revocation request, and the slave server end processing unit 42 connects to the database (MS) 5 through the slave server end transmission unit 41 and modifies the corresponding available limit value by resetting the available limit value to zero and updating the time and location information (t=t4). Finally, in step S13, the slave server end processing unit 42 connects to the corresponding gateway management node device 2 through the slave server end transmission unit 41 and modifies the corresponding available limit value stored in the corresponding memory unit (memory) 23 by resetting the available limit value to zero and updating the time and location information (t=t4).

The gateway network system with distributed network connection management and a gateway management method of the present application processes a user's token request through a plurality of gateway management node devices, allowing token data to be effectively synchronized or unified without affecting the user's token request process.

In addition, the gateway management slave server continuously records the used limit value and periodically compares the recorded used limit value and the recorded available limit value for token requests. If the available limit value is exceeded, an operation stop message is returned. Additionally, the token request is automatically updated in a timely manner to prevent security issues and achieve all of the aforementioned objectives.

Although the present invention has been disclosed in the preferred embodiments above, the embodiments thus disclosed are not intended to be limiting. Any person skilled in the art may make slight modifications and refinements without departing from the spirit and scope of the invention. Therefore, the scope of protection for the present invention should be defined by the claims of the attached patent application.

What is claimed is:

1. A gateway management method with distributed network connection management, applied in a large-scale application program interface of a gateway network system, wherein the gateway network system is designed to manage a token request from at least one user through at least one user end processing device for login to establish a connection to an enterprise end server; wherein the gateway network system comprises a plurality of gateway management node devices, a plurality of gateway management slave servers, and a database; wherein the database stores an available limit value and an used limit value; wherein each gateway management node device comprises a node end transmission unit, a node end processing unit, and a memory unit; wherein each gateway management slave server comprises a slave server end transmission unit and a slave server end processing unit; wherein the node end processing unit is equipped with an application program interface module, each node end transmission unit is non-transitory signally connected to the user end processing device and the slave server end transmission units, and each slave server end transmission unit is non-transitory signally connected to a corresponding node end transmission unit and the database; and wherein the gateway management method comprises the following steps:

a) the node end transmission unit of one of the gateway management node devices receiving the token request transmitted by the user through the user end processing device, and the node end processing unit then determining whether the token request is valid; if the token request is valid, the token request is stored in the memory unit and a connection to the enterprise end server is permitted;

b) the application program interface module of the node end processing unit converting the token request into a java script object notation (json) and transmitting the java script object notation (json) to one of corresponding gateway management slave servers through the node end transmission unit;

c) the slave server end transmission unit of the gateway management slave server receiving the java script object notation (json) transmitted by the node end transmission unit and storing the java script object notation (json) in the database; and d) when the node end transmission unit of one of the gateway management node devices receives an operation request input by the user logging into the application program interface module through the user end processing device, the node end processing unit transmitting the operation request to one of the plurality of gateway management slave servers through the node end transmission unit.

2. The gateway management method as claimed in claim 1, wherein the token request has an available limit value and a used limit value for recording the token request, wherein the gateway management method further comprises the following steps after step d):

e) the slave server end transmission unit of the gateway management slave server receiving the operation request, and the slave server end processing unit determining whether the used limit value of the token request exceeds the available limit value; if not, the slave server end processing unit permitting the operation request and connecting to a corresponding gateway management node device through the slave server end transmission unit and modifying a corresponding used limit value stored in a corresponding memory unit by increasing the used limit value by one; and f) if yes, the slave server end processing unit denying the user access.

3. The gateway management method as claimed in claim 1, wherein the available limit value and the used limit value have a corresponding time and location information, wherein step c) comprises the following steps:

c1) the slave server end processing unit returning a modified time and location information to a corresponding gateway management node device through the slave server end transmission unit; and c2) the node end transmission unit of the gateway management node device receiving the modified time and location information, and the node end processing unit storing the modified time and location information in the memory unit.

4. The gateway management method as claimed in claim 3, wherein the gateway network system further comprises a gateway management master server, the gateway management master server comprising a master server end transmission unit and a master server end processing unit, the master server end transmission unit being non-transitory signally connected to each slave server end transmission unit of the gateway management slave server and the database, wherein step c) further includes the following steps after step c2):

c3) the slave server end processing unit of one of the gateway management slave servers transmitting its associated time and location information to the gateway management master server through the slave server end transmission unit;

c4) the master server end transmission unit of the gateway management master server receiving the time and location information, enabling the master server end processing unit to perform time adjustment, and a corrected time and location information then being transmitted to other gateway management slave servers through the master server end transmission unit; and c5) the slave server end transmission units of the other gateway management slave servers receiving the corrected time and location information for allowing each slave server end processing unit to perform time adjustment.

5. The gateway management method as claimed in claim 3, wherein step c) further comprises the following steps after c2):

c3) the node end processing unit of the gateway management node device periodically sending a time adjustment request information to a corresponding gateway management slave server through the node end transmission unit after a predetermined time interval;

c4) the slave server end transmission unit of the gateway management slave server receiving the time adjustment request information, enabling the slave server end processing unit to determine whether a time correction is necessary and update the available limit value and the used limit value; and c5) if time correction is required, the slave server end processing unit transmitting a corrected time and location information along with the updated available limit value and the used limit value to the corresponding gateway management node device through the slave server end transmission unit, and the corrected time and location information along with the updated available limit value and the used limit value being received and stored in the database by the node end processing unit through the node end transmission unit to perform time and location information correction and update data.

6. The gateway management method as claimed in claim 3, further comprising the following steps after step f):

g) when the node end transmission unit of one of the gateway management node devices receives a token revocation request input by the user using the application program interface module though the user end processing device, the node end transmission unit transmitting the token revocation request to one of the corresponding gateway management slave servers through the node end transmission unit;

h) the slave server end transmission unit of the gateway management slave server receiving the token revocation request, and the slave server end processing unit connecting to the database through the slave server end transmission unit and modifying a corresponding available limit value by resetting the available limit value to zero and updating the time and location information; and i) the slave server end processing unit connecting to the corresponding gateway management node device through the slave server end transmission unit and modifying the corresponding available limit value stored in a corresponding memory unit by resetting the available limit value to zero and updating the time and location information.

7. The gateway management method as claimed in claim 1, wherein the gateway network system further comprises a load balancer, which is connected by telecommunication to the user end processing device and the gateway management node devices, wherein the gateway management method further comprises the following additional step in step j') before step a): the load balancer providing the connection to the gateway management node devices for load distribution to one of the gateway management node devices.

8. A gateway network system with distributed network connection management applied for gateway control of a large-scale application program interface, wherein the gateway network system with distributed network connection management facilitates managing a token request from at least one user through at least one user end processing device during login for connecting to an enterprise end server, wherein the gateway network system comprises:

a database, for storing an available limit value and a used limit value;

a plurality of gateway management node devices, each comprising:

a node end transmission unit, being non-transitory signally connected to the user end processing device and receiving the token request transmitted by the user through the user end processing device;

a node end processing unit, having an application program interface module for determining whether the token request is valid, wherein if the token request is valid, a connection to the enterprise end server is permitted and the token request is converted into a java script object notation (json) and the java script object notation (json) is output through the node end transmission unit, and when the node end transmission unit receives an operation request input by the user logging into the application program interface module through the user end processing device, the node end transmission unit outputs the operation request through the node end transmission unit; and a memory unit, for storing the java script object notation (json);

a plurality of gateway management slave servers, each comprising:

a slave server end transmission unit, being non-transitory signally connected to each node end transmission unit and the database, receiving the java script object notation (json) and the operation request transmitting from the node end transmission unit respectively, and storing the java script object notation (json) in the database; and a slave server end processing unit, wherein when the slave server end transmission unit receives the operation request, the slave server end processing unit connects to the database through the slave server end transmission unit.

9. The gateway network system as claimed in claim 8, wherein the token request has the available limit value and the used limit value for recording the token request, and the slave server end processing unit further determines whether the used limit value exceeds the available limit value; if not, the slave server end processing unit permits the operation request, connects to a corresponding gateway management node device through the slave server end transmission unit, and modifies a corresponding used limit value stored in a corresponding memory unit by increasing the used limit value by one; if yes, the slave server end processing unit denies the user access.

10. The gateway network system as claimed in claim 8, wherein the available limit value and the used limit value have a corresponding time and location information; wherein the slave server end processing unit returns modified time and location information to a corresponding gateway management node device through the slave server end transmission unit; and wherein the node end transmission unit of the gateway management node device receives the modified time and location information and the node end processing unit stores the modified time and location information in the memory unit.

11. The gateway network system as claimed in claim 10, wherein the gateway network system further comprises a gateway management master server, the gateway management master server comprising a master server end transmission unit and a master server end processing unit, the master server end transmission unit being non-transitory signally connected to each slave server end transmission unit of the gateway management slave server and the database; wherein the slave server end processing unit of one of the gateway management slave servers transmits its associated time and location information to the gateway management master server through the slave server end transmission unit; wherein the master server end transmission unit of the gateway management master server receives the associated time and location information for allowing the master server end processing unit to perform time adjustment and transmits corrected time and location information to other gateway management slave servers through the master server end transmission unit, each slave server end transmission unit of the other gateway management slave servers receiving the corrected time and location information for allowing each slave server end processing unit to perform time adjustment.

12. The gateway network system as claimed in claim 10, wherein the node end processing units of the gateway management node devices periodically send a time adjustment request information to a corresponding gateway management slave server through the node end transmission unit after a predetermined time interval; wherein the slave server end transmission units of the gateway management slave servers receive the time adjustment request information, enabling the slave server end processing unit to determine whether time correction is necessary and update the available limit value and the used limit value; if time correction is required, the slave server end processing unit transmits corrected time and location information along with an updated available limit value and the used limit value to the corresponding gateway management node device through the slave server end transmission unit, and the node end processing unit receives the corrected time and location information along with the updated available limit value and the used limit value and stores the corrected time and location information along with the updated available limit value and the used limit value in the database through the node end transmission unit to perform time and location information correction and update data.

13. The gateway network system as claimed in claim 10, wherein when the node end transmission unit of one of the gateway management node devices receives a token revocation request input by the user using the application program interface module through the user end processing device, the node end transmission unit transmits the token revocation request to one of corresponding gateway management slave servers through the node end transmission unit; wherein when the slave server end transmission unit of the gateway management slave server receives the token revocation request, the slave server end processing unit connects to the database through the slave server end transmission unit and modifies a corresponding available limit value by resetting the available limit value to zero and updating the time and location information, and the slave server end processing unit connects to the corresponding gateway management node device through the slave server end transmission unit and modifies the corresponding available limit value stored in a corresponding memory unit by resetting the available limit value to zero and updating the time and location information.

14. The gateway network system as claimed in claim 8, wherein the gateway network system further comprises a load balancer, which is connected by telecommunication to the user end processing device and the gateway management node devices, wherein the load balancer provides the connection to the gateway management node devices for load distribution to one of the gateway management node devices.

* * * * *